Aug. 31, 1954  H. L. MILLS  2,688,125
SAFETY ALARM DEVICE FOR MOTION-PICTURE PROJECTORS
Filed Oct. 26, 1951  2 Sheets-Sheet 1

Herbert L. Mills
INVENTOR.

Aug. 31, 1954     H. L. MILLS     2,688,125
SAFETY ALARM DEVICE FOR MOTION-PICTURE PROJECTORS
Filed Oct. 26, 1951                                            2 Sheets—Sheet 2

Herbert L. Mills
INVENTOR.
BY *Clarence A. O'Brien*
*and Harvey B. Jackson*
Attorneys Patented Aug. 31, 1954

2,688,125

UNITED STATES PATENT OFFICE 2,688,125

SAFETY ALARM DEVICE FOR MOTION-PICTURE PROJECTORS

Herbert L. Mills, San Antonio, Tex.

Application October 26, 1951, Serial No. 253,385

3 Claims. (Cl. 340—259)

This invention relates to safety devices for motion picture apparatus and it has particular reference to a safety alarm or warning device which is operated upon breaking or jamming of a film running through a projector or upon occurrence of a faulty take-up, upon occurrence of a break or defect in the take-up reel, the belt driving it etc., and which gives notice to the operator when such breaking or jamming occurs so that the projector may be cut out instantly by the operator.

The invention has for its main object to provide a safety alarm or warning device of the above type which is simple and reliable which has no parts which may get out of order and which may be reduced to such a size that the device may be mounted on an existing take-up reel magazine so that it can be used on any motion picture apparatus without entailing a major change of construction or the locating of parts of the device within the projector housing.

As well known, breaking or jamming of the film usually entails an excessive heating of the same with consequent danger of fire, as the film can only stand the heat of the light beam when drawn at relatively high speed across said beam. Heavy damage to the equipment results in such a case due to the jamming of the film in the projector head, sound head or lower magazine. It is therefore a major advantage when the operator is warned that a breaking has occurred or jamming is about to occur.

In order to indicate speedily the occurrence of a break or conditions which will produce a break in the immediate future the operation of the alarm signal may be made dependent on the tension of the film.

Alarm signals of this type have been proposed but such signals, as proposed, form part of the projector proper and are located within the projector housing on or near the film gate. Such a construction however requires a special projector design, including the warning signal equipment from the outset, and it excludes the mounting of a signal equipment on existing projectors. This is necessary because the signals in most cases are operated by the tension of the film running through the projector.

As well known, the take-up reel is usually driven with a speed which corresponds to or is slightly larger than the speed with which a film is unreeled and passes through the projector, this being necessary because the speed of reeling is not constant. The driving means of the take-up reel are for this reason coupled with the reel by means of a frictional coupling which permits gliding, and the film is pulled into the magazine while somewhat under tension. It is therefore possible to utilize the tension of the film within the magazine in order to operate the safety alarm device.

According to the invention, therefore, a member responsive to the tension of the film, such for instance as a roller, which is swingably or shiftably mounted on a swinging arm is arranged within the magazine of the take-up reel and is applied against the film, preferably so arranged that even when the film is completely or nearly completely unreeled, the roller still produces a certain change of direction. The roller will thus be held by the film in a certain position in which it swings out a weighted lever or arm which is arranged outside the magazine.

Further, according to the invention, the magazine carries a bracket on the outside carrying all the remainder of the structure which consists in a switch associated with and closed by the weighted arm or lever operated by the roller and consists further in a transformer for producing a low voltage current in a circuit controlled by said switch and a visible or audible alarm signal which draws the attention of the operator to the abnormal conditions. All these units or components may be easily mounted on the bracket attached to the take-up reel magazine and will occupy only little space on the outside of the magazine, while only the roller and the arm on which it swings project into the magazine but occupy very little space and can be arranged between the magazine wall and the reel. The device can therefore be mounted on existing take-up reel magazines without any difficulty.

More specific objects of the invention and further features of the same will be apparent from the following detailed specification.

The invention is illustrated in the accompanying drawings showing one embodiment thereof. It is however to be understood that the embodiment shown has been selected in order to explain the principle of the invention and the best mode of applying the principle. Therefore the fact that merely a single embodiment of the invention has been illustrated is not to be considered as limitative and a departure from the embodiment illustrated in the drawings is therefore not necessarily a departure from the principle of the invention.

In the drawings:

Figure 8 is a diagram of the connections.

Figure 1:
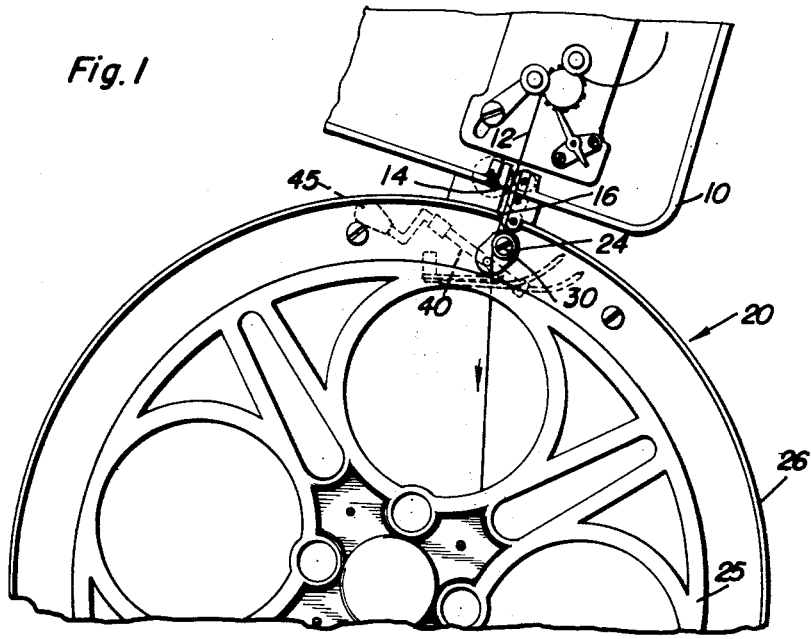
Figure 1 is an elevational, partly sectional view of the lower portion of a projector sound head housing and of a portion of the take-up reel magazine.
Figure 2:
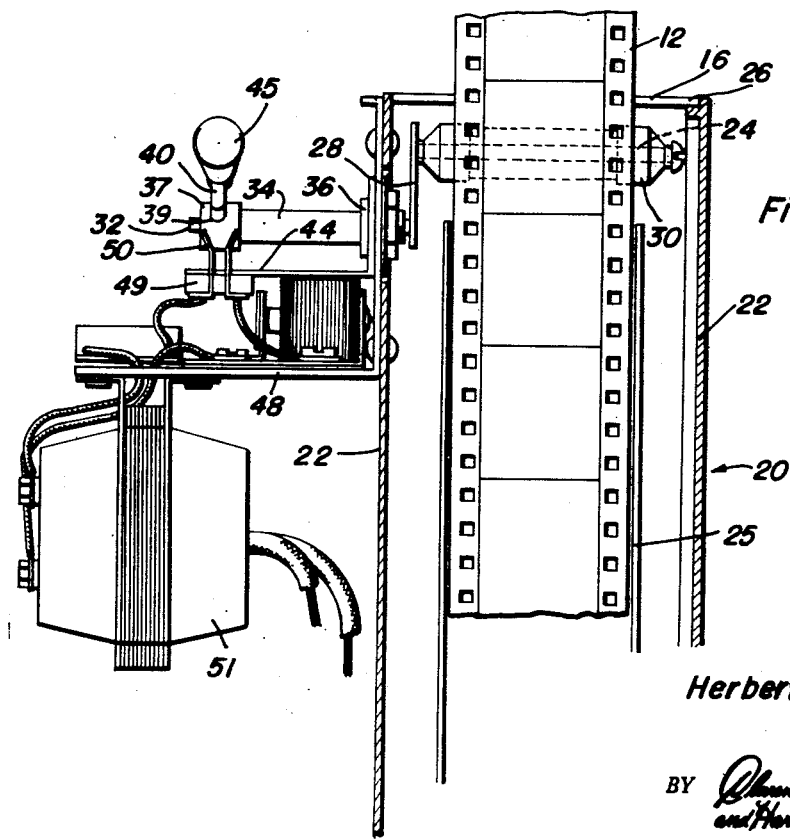
Figure 2 is an elevational and sectional side view of the take-up reel magazine and of the parts of the safety alarm device mounted thereon.
Figure 3:
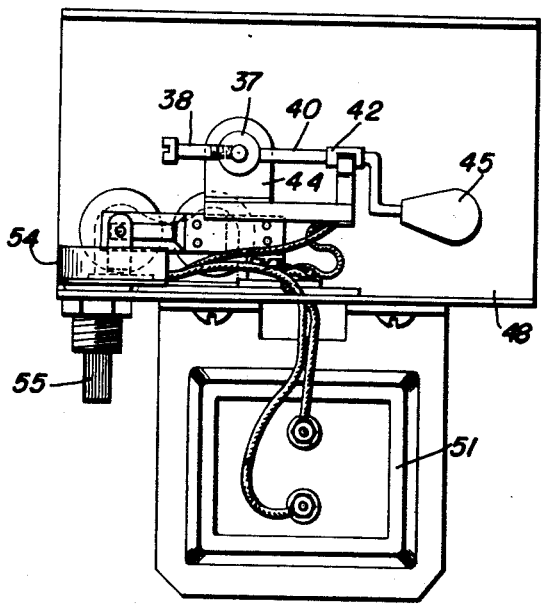
Figure 3 is an elevational side view of the alarm device mounted on the take-up reel magazine.
Figure 5:
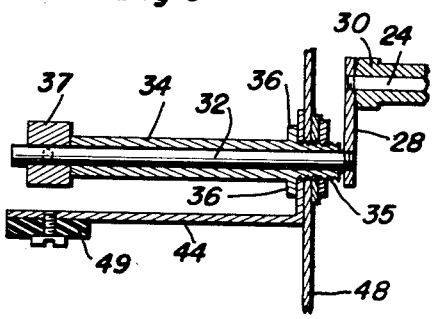
Figure 5 is an elevational sectional view, the section being taken along line 5—5 of Figure 4.
Figure 4:
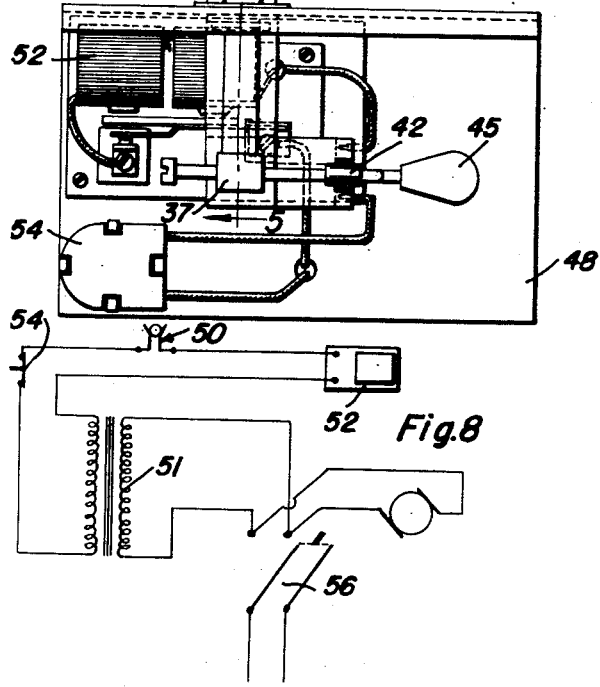
Figure 4 is a plan view of the device.
Figure 6:
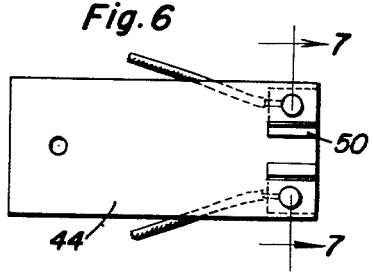
Figure 6 is a plan view of a detail.
Figure 7:
Figure 7 is a sectional view through a detail, the section being taken along line 7—7 of Figure 6.

In the example shown in the drawing and illustrated in Figure 1, the lower portion of the projector sound head housing is indicated at 10 and it is seen that the film 12 after having passed the film gate and the sound gate and a number of sprocket wheels passes through the exit slot 14 of the projector housing which may or may not be provided with a number of guiding rollers leading the film to the entrance slot 16 of the take-up reel magazine 20. The magazine casing is essentially cylindrical and surrounds the reel 25. In the space between the outer peripheral wall 26 of the magazine casing and the take-up reel 25 a roller 30 is arranged which turns on the axle 24, projecting from a swing arm 28 into the space between the rim of the reel 25 and the magazine casing. The swing arm 28 is arranged close to the side wall 22 of the magazine casing and is carried by a shaft 32 rotatably held in the magazine side wall 22. While the end of the shaft 32 which carries the swing arm 28 with the roller axle 24 projects into the interior of the magazine casing, the shaft itself projects through the wall to the outside.

The shaft 32 in the example shown is surrounded by a sleeve 34 which may be screw threaded at its end, as indicated at 35, and which also carries a collar 36, while the screw threaded portion 35 serves to engage a nut which holds the sleeve on the wall 22 simultaneously engaging and holding brackets, described below, on said wall. The sleeve 34 serves as a journaling means for the shaft 32 which passes through its hollow interior and is held therein. At its outwardly projecting end the shaft 32 carries a collar 37 which may be coupled with the shaft by means of a set screw 38 so that it rotates with the shaft and also holds it against axial displacement.

The collar 37 is provided with a further bore 39 within which a lever or arm 40 is held which is preferably bent at its end and which carries a weight 45. The rod forming the lever 40 forms one member of a switch and carries a copper roller 42 which is insulated.

The copper roller forms one of the contacts of said switch. The remainder of the switch is carried by a bracket 44 which projects outwardly from the side wall 22 of the magazine casing 20 and which is held together with a larger angular bracket 48 on the magazine side wall 22. The brackets 44 and 48 are gripped and held by the collar 36 and by a nut engaging the threads 35 of the sleeve 34.

The bracket 44 has an insulating plate 49 to which two contact springs 50 are fixed which are provided with flaring or divergent ends and which are facing the contact roller 42. The said contact roller may enter between the two spring contacts 50 bridging the same when the lever arm 40 moves down under the influence of gravity acting on the weight 45.

The larger angular bracket 48 carries all the other members of the alarm device. These members include a transformer 51, provided in order to produce a low voltage operation of the alarm device, the buzzer or other alarm signal 52 and a small switch 54 which is operable by a button 55 and which serves the purpose of cutting the alarm circuit off when the projector is in operation without film. Switch 54 may also be used after an alarm has been given, in order to cut out the signal once the operator has been warned and has operated the main switch of the projector which is arranged at its regular place and which is indicated at 56 in the diagram Figure 8.

The operation of the device will be easily understood from the foregoing description. Under normal conditions the film running through the projector and reeled on the take-up reel 25 is under a certain tension and holds the roller 42 in such a position that the lever arm 40 is raised and its contact roller is held above the spring contacts 50. When a break occurs the film slackens and is no longer in a position to hold the roller. The weight 45 therefore, under the influence of gravity, turns the arm 40 and the contact roller bridges the two contacts 50, thus closing the circuit of the alarm signal. Upon receiving the alarm signal the operator may throw the switch 56 and cut out the projector. In order to avoid continuous operation of the alarm signal the operator may also press button 55 in order to cut the alarm circuit. After having readjusted the projector or after having inserted a new film the operation may continue and under the normal tension of the film the alarm switch will again be held by the tension of the film in the take-up reel magazine.

According to the invention therefore a small alarm device is provided which may be directly mounted on the take-up reel magazine without any adaptation except the fixation of the brackets and of the shaft axle 32 and which practically occupies only a negligible space within the magazine. Also, the members carried outside occupy only little space so that the device may be fixed to existing equipment without difficulty. Moreover, the equipment is simple, reliable and effective and cannot get out of order easily.

It will be understood that various changes of the unessential parts may be made without in any way departing from the essence of the invention as defined in the annexed claims.

Having described the invention, what is claimed as new is:

1. A safety device adapted for being mounted on and within the take-up reel magazine for supervising the winding of a film on a take-up reel, said take-up reel magazine being provided with an entrance slot for the film admission, comprising a film tension sensing feeler unit and an alarm contact unit, said units being adapted to be joined and to be conjointly mounted on said take-up reel magazine to form a single alarm producing unit, the feeler unit being arranged within the take-up reel magazine, while the alarm contact unit is arranged on the outside, the film tension sensing feeler unit including a roller arranged near the entrance slot for the film and extending axially across said magazine, said roller being applied against and displaceable by the film which has entered the magazine through the said slot, an axle carrying said roller, and a swing arm carrying said axle, the aforesaid alarm contact unit including a rotatable shaft arranged substantially outside the take-up reel magazine, but projecting with one end into the interior of said magazine, said shaft being parallel to the axle carrying said roller and the end projecting into the interior carrying the swing arm, a sleeve concentric with the said shaft fixedly mounted on the take-up reel magazine journaling said rotatable shaft so that a rocking movement may be performed by the same and by the swing arm attached to it, said shaft projecting on its outer end beyond said sleeve, a collar with a weighted arm fixed on the outer end of said rotatable shaft, a bracket attached to and carried by said take-up reel magazine, carrying fixed contact springs, a movable bridging contact carried by the weighted arm and bridging said fixed contact springs, when the weighted arm is moved downwardly under the influence of gravity, the tension of the film and its pressure on the roller holding the latter, the swing arm, the rotatable shaft, and the weighted arm in a lifted position, counteracting the influence of gravity during the normal reeling up of the film, and an alarm signal circuit including an alarm signal connected with the two fixed contact springs and with means for supplying low voltage currents.

2. A safety alarm device as claimed in claim 1 wherein one end of the sleeve journaling the rotatable shaft is threaded and projects through a hole into the take-up reel magazine, said sleeve being provided near the aforesaid end with a collar applied against the take-up reel biasing from the outside for supporting the entire alarm producing unit and for joining the two units forming the alarm producing unit, said collar being fixed to the magazine by means of a nut on the threaded end of the sleeve, and wherein said bracket is also provided with a supporting extension having an aperture for the passage of the end of the threaded sleeve, said bracket being held by said collar and said nut on said magazine.

3. A safety alarm device as claimed in claim 1 wherein an additional hand operated switch is inserted into the alarm circuit and is carried by said angular bracket for opening the alarm circuit manually.

References Cited in the file of this patent

UNITED STATES PATENTS

| Number | Name | Date |
|---|---|---|
| 2,109,373 | Landrock | Feb. 22, 1938 |
| 2,252,853 | Hoover | Aug. 19, 1941 |
| 2,555,949 | Wilson | June 5, 1951 |

FOREIGN PATENTS

| Number | Country | Date |
|---|---|---|
| 707,730 | France | Apr. 20, 1931 |